United States Patent
Chien et al.

(10) Patent No.: US 6,928,430 B1
(45) Date of Patent: Aug. 9, 2005

(54) PREFIX MATCH SEARCH SCHEME

(75) Inventors: Fangli Chien, San Jose, CA (US); Nelson L. Chow, Mountain View, CA (US); Paul Cheng, San Jose, CA (US)

(73) Assignee: Integrated Silicon Solution, Inc., Santa Clara, CA (US)

( * ) Notice: Subject to any disclaimer, the term of this patent is extended or adjusted under 35 U.S.C. 154(b) by 445 days.

(21) Appl. No.: 10/128,844

(22) Filed: Apr. 23, 2002

(51) Int. Cl.[7] ............................................. G06F 17/30
(52) U.S. Cl. .................. 707/3; 707/4; 707/5
(58) Field of Search .................. 707/1–3, 10, 100, 707/102, 200; 709/242, 200; 711/1–3, 100

(56) References Cited

U.S. PATENT DOCUMENTS 6,522,632 B1 * 2/2003 Waters et al. ............... 370/254
6,633,953 B2 * 10/2003 Stark ........................... 711/108
2003/0009453 A1 * 1/2003 Basso et al. .................... 707/3

* cited by examiner

*Primary Examiner*—Alford W. Kindred
(74) *Attorney, Agent, or Firm*—Raymond E. Roberts; Intellectual Property Law Offices (57) ABSTRACT

A search scheme (10) in which a controller (14) provides a search key (16) to a search engine (18, 36). In one variation, the search engine (18) provides a match address (20) based on prefix matching to an associate content (AC) memory (22) and the AC memory provides a search result (24) back to the controller. In an other variation the search engine (36) effectively may include the AC and itself provide the search result (24). Within the search engine (18, 36) every possible prefix for possible respective prefix lengths in the search key may be represented, either by a bit which addressable maps to the search result, by content addressable memory (CAM) (32) associatively mapping to the search result, or by directly addressing the search result (24).

38 Claims, 8 Drawing Sheets

FIG. 1
(background art)

| Entry no. | Search key | Associated content |
|---|---|---|
| 1 | 00* | A |
| 2 | 0000* | B |
| 3 | 0001* | C |
| 4 | 00101* | D |
| 5 | 010* | E |
| 6 | 0110* | F |
| 7 | 0111* | G |
| 8 | 100* | H |
| 9 | 101000* | I |
| 10 | 101001* | J |
| 11 | 10101* | K |
| 12 | 10110* | L |
| 13 | 10111* | M |
| 14 | 110* | N |
| 15 | 11101000 | O |
| 16 | 11101001 | P |

| Bits | Description |
|---|---|
| 0 | Unused |
| 1 | Store the prefixes with prefix length 16 |
| 2..3 | Store the prefixes with prefix length 17 |
| 4..7 | Store the prefixes with prefix length 18 |
| 8..15 | Store the prefixes with prefix length 19 |
| 16..31 | Store the prefixes with prefix length 20 |

FIG. 13a

| Bits | Description |
|---|---|
| 0 | Unused |
| 1 | Store the prefixes with prefix length 21 |
| 2..3 | Store the prefixes with prefix length 22 |
| 4..7 | Store the prefixes with prefix length 23 |
| 8..15 | Store the prefixes with prefix length 24 |

PREFIX MATCH SEARCH SCHEME

TECHNICAL FIELD

The present invention relates generally to static information storage and retrieval systems, and more particularly to architectures for prefix match searching in large databases of stored data. It is anticipated that a primary application of the present invention will be Internet protocol (IP) routing.

BACKGROUND ART

Many real world systems require searching information at very high speeds; hence hardware based approaches are often employed. An increasingly common example, and the one which will primarily be used herein, is searching in communication and networking systems. In information searching, there are basically three desired types of searching: exact match, longest prefix match, and partial match searching.

Of present interest is longest prefix match (LPM) searching. A typical application of this is in Internet protocol (IP) based routing. Two approaches widely used today for longest prefix match searching are content addressable memory (CAM) based searching, and algorithm-based searching.

Figure 1:
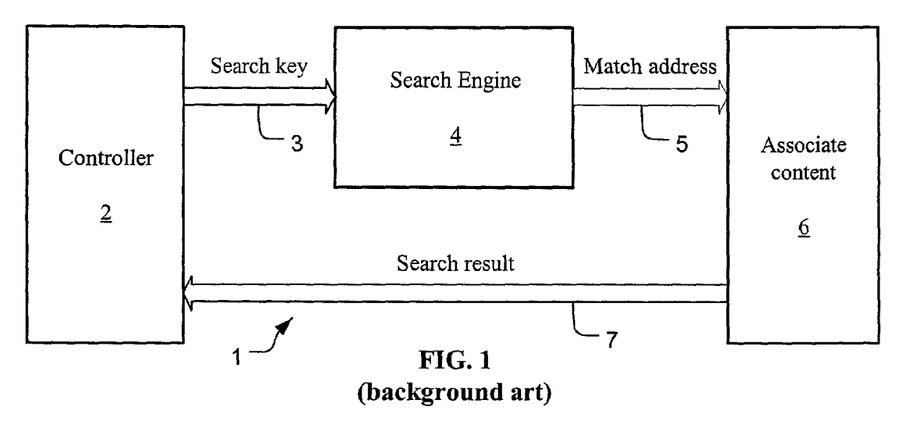
FIG. 1 (background art) is a block diagram showing a search system that uses a search engine, as might be found in a typical internetworking configuration today.

FIG. 1 (background art) is a block diagram showing a search system 1 that uses a search engine, as might be found in a typical internetworking configuration today. A controller 2 sends a search key 3 to a search engine 4. In response to that the search engine 4 provides a corresponding match address 5, which is used to read an associated content (AC)(or associated data) from an AC memory 6. This AC is then returned to the controller 2 as a search result 7. In LPM searching, there may be many entries matching the given search key 3 and, in this case, the entry with the longest matching prefix is chosen.

Figure 2:
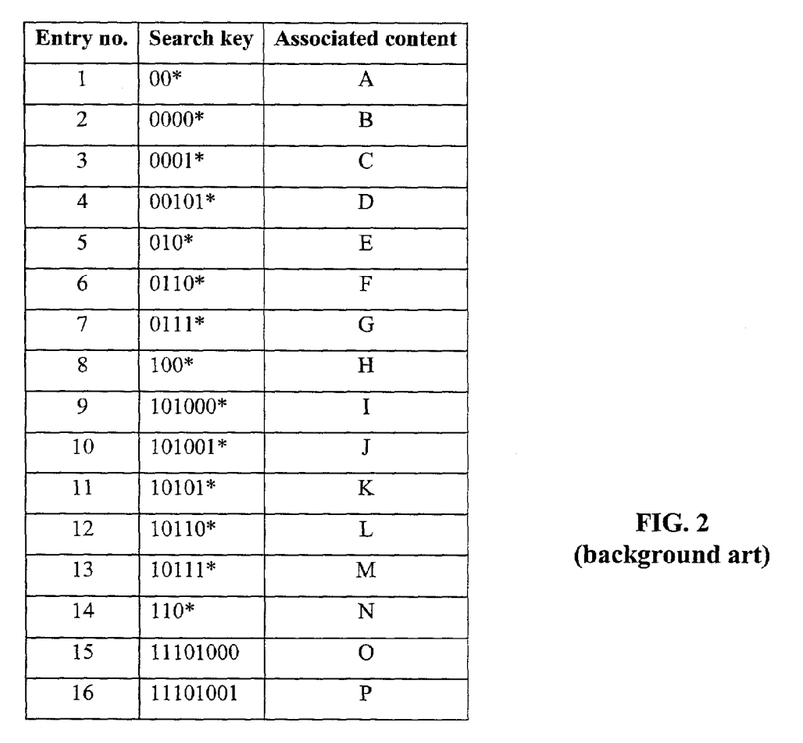
FIG. 2 (background art) is a table of example search data for the search engine in FIG. 1.

FIG. 2 (background art) is a table of example search data for the search engine 4 described in FIG. 1. In this example, the maximum length of the search key 3 (i.e. the search key width) is eight bits. The table contains 16 entries. The symbol "*" is used here to indicate that all of the subsequent bits are do not care cases; in other words, the bits to the left of the "*" indicate the prefix that should be used. If the search key is "00001011, "then two entries match—the first and second entries. The first entry matches two prefix digits, while the second entry matches four prefix digits. So, the longest prefix matching entry is the second entry, and its corresponding address stores an AC with the value B.

For implementation of LPM database tables, CAM would appear to provide a good high speed solution, since the hardware inherently performs a simultaneous comparison of all table entries for the search key. However, as is widely appreciated by those skilled in the art, CAM can only be used for small search spaces because of its high power dissipation and expense, and scalability problems.

Algorithm-based searching is a currently used alternate approach. It is mostly based on a data structure called the "trie." The trie is a radix search tree. The idea is very simple: a leaf in a tree structure represents a particular prefix and the value of this prefix corresponds to the path from the root of the tree to the leaf.

Figure 3:
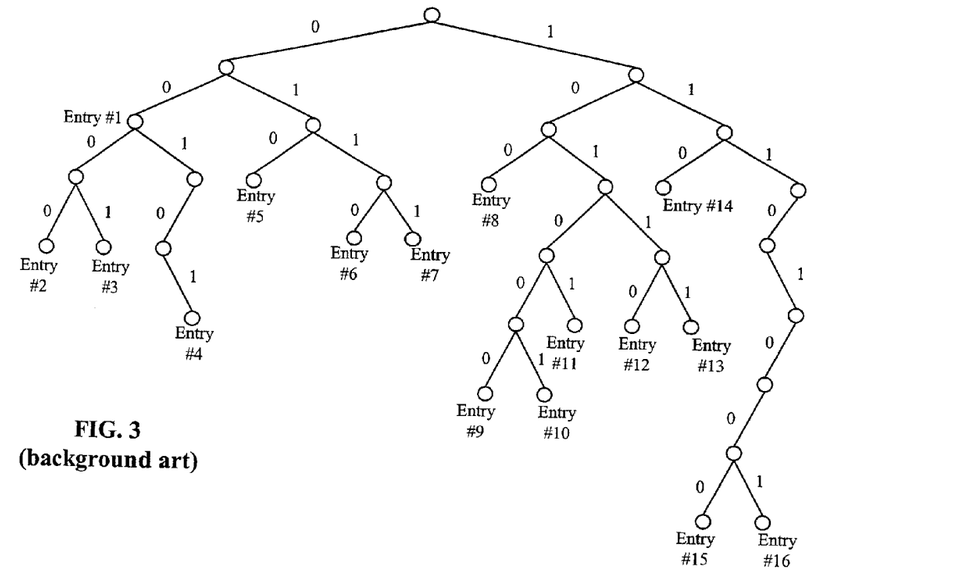
FIG. 3 (background art) depicts a trie corresponding to the binary strings (search keys) in FIG. 2.

Consider a small example. FIG. 3 (background art) depicts a trie corresponding to the binary strings (search key 3) in FIG. 2. In particular, the string 010 corresponds to the path starting at the root and ending in a leaf at the third level: first a left-turn (0), then a right-turn (1), and finally a turn to the left (0). This simple structure is not very efficient. The number of nodes may be large and the average depth (the average length of a path from the root to a leaf) may be long.

A traditional technique to overcome this problem is to use path compression. Each internal node with only one child is removed, and stores two numbers, the "skip count" and the "skip value," which indicate how many bits and the value that have been skipped on the path, respectively. A path-compressed binary trie is sometimes referred to as a Patricia tree.

Figure 4:
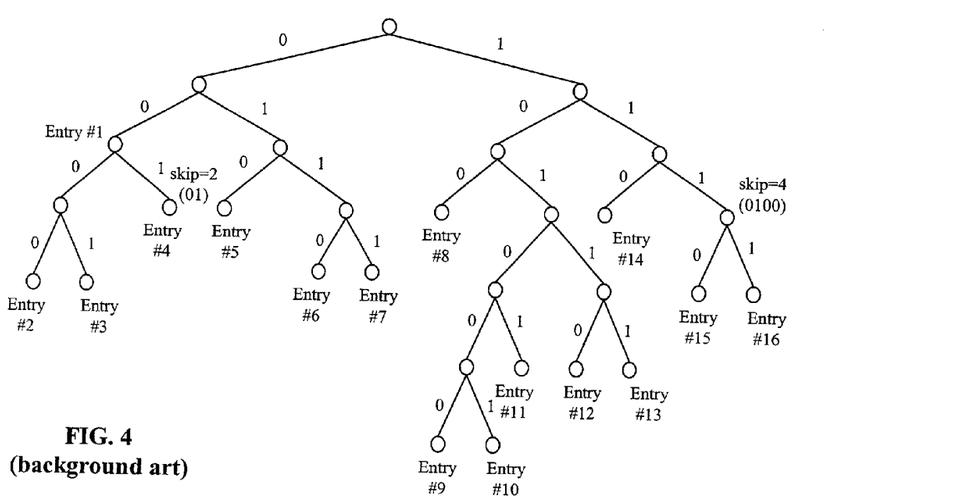
FIG. 4 (background art) depicts a Patricia trie, the most common approach currently used for address table lookup.

FIG. 4 (background art) shows a Patricia trie. It is the most common approach currently used for address table lookup. For instance, it is used in the FreeBSD Unix kernel (developed at the University of California, Berkeley). The total number of nodes in the trie is $2n-1$, where n is the number of leaves in the O(n), where n is the number of bits in a search string. If one lookup per memory access time is desired, pipelining is therefore needed, and each level needs to be stored in a separate memory. However, in the case of IPv4 (Internet protocol, version four), for example, this will lead to a wasteful 32-stage pipeline for the 32-bit string searching required.

Figure 5:
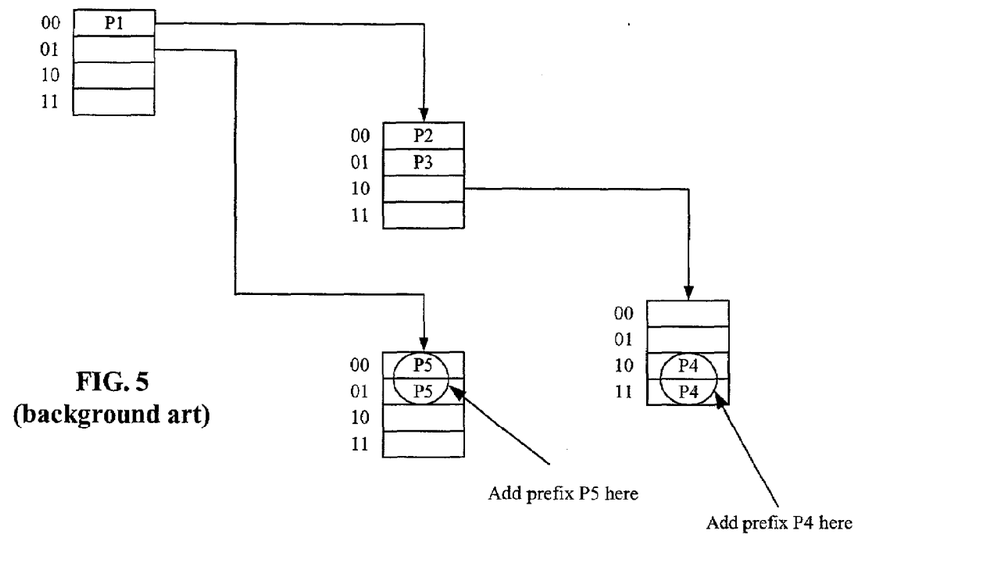
FIG. 5 (background art) depicts an "expanded multi-bit trie," a trie scheme which may be used to speed up lookups.

FIG. 5 (background art) shows another trie scheme which may be used to speed up lookups, the "expanded multi-bit trie." Continuing with the example data in FIG. 2, a multi-bit trie that examines addresses two bits at a time and stores the first five prefixes is shown in FIG. 5. Each array has four locations, each of which can store a prefix, and optionally also contain a pointer to another trie node. Thus the 00 entry in the root node stores the prefix P1=00*, and also points to all prefixes that start with 00. All prefixes must be expanded to lengths that are multiples of two. Thus the prefix P4=00101* here necessarily expands to two 6-bit prefixes 001010* and 001011*, and is stored in the third and fourth locations of the right-most array. Similarly, the prefix P5=010* expands to two 4 bit prefixes 0100*, and 0101*, and is stored in the first two locations of the lower-left-most array.

It is important to note that only a prefix entry with the longest prefix is stored in each trie node. So, the insertion of a single prefix may result in the need to either write or update many array locations. Similarly, the removal of a single prefix may also result in many entries having to be deleted or updated, in order to restore the information of a shorter prefix. This process, which can be quite demanding, usually burdens the CPU (if managed by software) or requires complicated logic (if managed by hardware). In addition, like before, each layer of the trie will need to be implemented in a different physical memory if the design is to be pipelined for lookups in a single memory access time. This leads to problems because the memory cannot be dynamically shared; it could happen that a single layer of the trie could exhaust its memory while other layers still have free space. Finally, with this approach, the total number of elements that can be stored in the table is not capacity deterministic. It depends on the distribution of prefixes and the total memory size.

Figure 6:
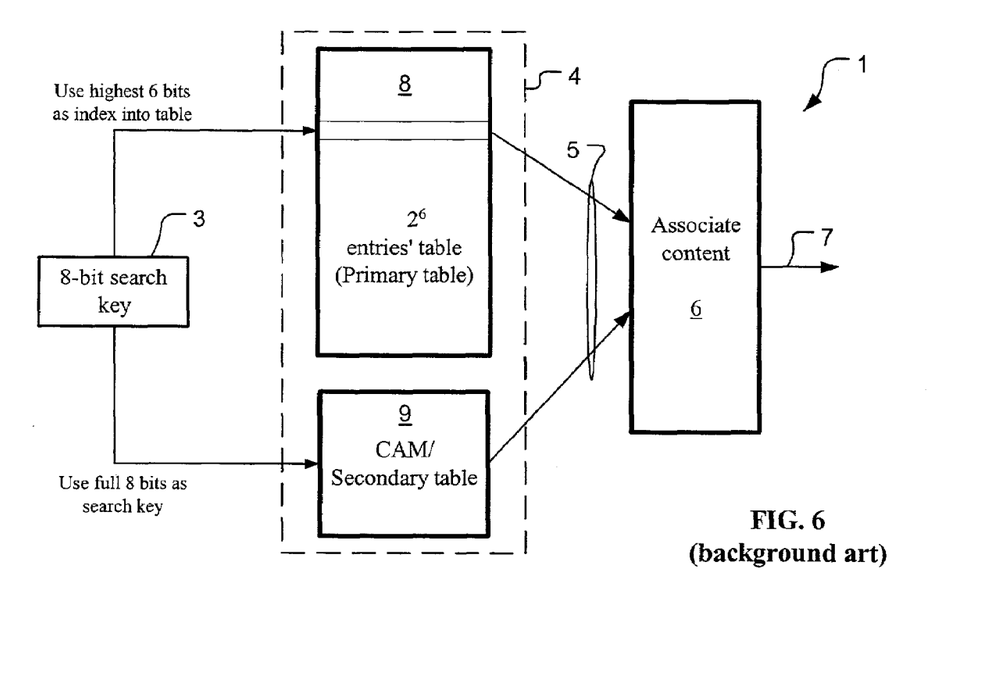
FIG. 6 (background art) is a block diagram showing an example of a direct memory look up scheme implementation.

FIG. 6 (background art) shows an example implementation of a direct memory lookup scheme. Again, the controller 2 (FIG. 1) sends the search key 3 to the search engine 4, the search engine 4 sends a match address 5 to the AC memory 6, and an AC entry is retrieved from the AC memory 6 and returned as the search result 7 to the controller 2.

The search engine 4 here particularly contains a primary table 8 and a secondary table 9. The highest n bits of the search key 3 are used as an index into the primary table 8 (typically implemented in RAM) to retrieve the match address 5, and the secondary table 9 (in RAM or CAM) is used to store the prefixes with lengths longer than n. In this case, the primary table 8 may look like an expanded 6-bit trie node. Within it, for each 6-bit value, only the prefix with longest prefix length is stored. If the longest prefix length for the location is less then six, it must "expand" and fill out the prefix information into neighboring locations just like the "expanded multi-bit trie" does. Thus, the same table maintenance issue as found in trie-based searching is evident. In fact, since this approach inherits the properties of an expanded 6-bit trie, on average, it needs more entry updates when performing maintenance, compared with expanded multi-bit tries.

In summary, all existing schemes have problems of performance, scalability, generality, cost, or maintenance. Lookup schemes based on trie and binary search are too slow and do not scale well; present CAM based solutions are expensive; and direct memory lookups are not easy to maintain.

Accordingly, it should be apparent that there is a need for a scheme which is cheap, deterministic for the worse case, high speed, supports large databases, and is easily maintained by hardware circuits.

DISCLOSURE OF INVENTION

Accordingly, it is an object of the present invention to provide a prefix search scheme which is fast and supports large databases.

Another object of the invention is to provide such a search scheme which can perform longest prefix match (LPM) searching.

And another object of the invention is to provide such a search scheme which is deterministic for the worst case.

Briefly, one preferred embodiment of the present invention is a method of performing searching based on prefix matching. A search key is received. Then one or more tables are addressably accessed based on the search key. These tables each include p-bits representing all possible prefixes of one prefix length and each p-bit is either an enabled p-bit indicating that its prefix matches the search key or a disabled p-bit indicating otherwise. Then up to one enabled p-bit is determined from each table to be a match p-bit and up to one match p-bit is selected to be a priority p-bit. Finally a match address is derived based on consideration of the priority p-bit, wherein the match address is where a search result is stored.

Briefly, another preferred embodiment of the present invention is a search engine for performing prefix match searching. A primary memory is provided that is suitable for addressably storing one or more tables of p-bits representing all possible prefixes of one prefix length. Each p-bit may be either an enabled p-bit, indicating that its prefix matches a search key, or a disabled p-bit indicating otherwise. A database search unit (DSU) is further provided that is suitable for receiving a search key via an input bus, accessing the primary memory based on addressing derived from the search key, determining up to one enabled p-bit from each table to be a match p-bit, selecting up to one match p-bit to be a priority p-bit, and deriving a match address based on consideration of the priority p-bit, wherein the match address is where a search result is stored.

An advantage of the present invention is that it concurrently provides a prefix search scheme which is fast, supports large databases, and may perform LPM searching or other types of priority based searching.

Another advantage of the invention is that it is deterministic, even selectively so in multiple respects. Embodiments of the invention may be made capacity deterministic, able to handle worst possible case of prefix clustering that would overload prior art systems. The invention is also inherently very time deterministic, being able to resolve all searches or look ups in consistent, short periods. Furthermore, the invention is also maintenance or update deterministic. It also performs add, update, and delete operations in consistent, short periods of time. In concert with its capacity deterministic capability, such maintenance operations can always be performed, even in worst case scenarios.

Another advantage of the invention is that it is easily implemented and maintained in hardware circuits. It may employ various memory types, such as RAM (including DRAM and SRAM) and CAM. In particular, however, it the use of CAM is optional, and then its use may be sparing and in very efficient manner.

Another advantage of the invention is that it is economical.

And another advantage of the invention is that it is scalable.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended figures of drawings in which.

BEST MODE FOR CARRYING OUT THE INVENTION

A preferred embodiment of the present invention is a system, or scheme, for prefix match searching. As illustrated in the various drawings herein, and particularly in the view of FIG. 7, this preferred embodiment of the invention is depicted by the general reference character 10.

The key benefit of the search scheme 10 is that every possible prefix for every possible prefix length in a search key may be represented. In some embodiments of the invention this may be a goal, and it is then a realizable one even if the database to be searched is large. In other embodiments, where other goals may influence design, the invention flexibly permits compromise. It then provides that every possible further prefix extending from a represented prefix is represented (e.g., any specific 6-bit prefixes represented in an 8-bit system will also have "related" 7-bit and 8-bit prefixes represented; thus, when 101010 is represented, 1010100, 1010101, 10101000, 10101001, 10101010, and 10101011 are represented as well).

Figure 7:
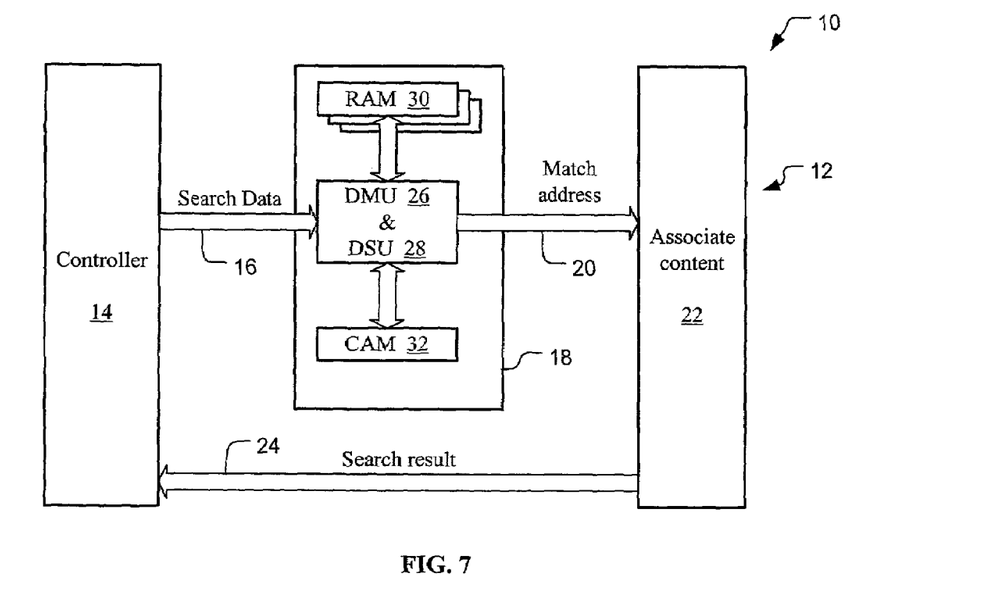
FIG. 7 is a block diagram showing one implementation of the inventive search scheme.

FIG. 7 is a block diagram showing the inventive search scheme 10 implemented in a search system 12. A controller 14 provides a search key 16 to a search engine 18, the search engine 18 provides a match address 20 to an associate content memory (AC memory 22), and the AC memory 22 provides a search result 24 back to the controller 14. The controller 14 and the AC memory 22 may be essentially conventional. The search key 16, the match address 20, and the search result 24 may also be conventional in format, and typically travel via conventional buses. The novel aspects of the inventive search scheme 10 are therefore primarily in the search engine 18.

In this embodiment, the search engine 18 includes four major components: a database maintenance unit (DMU 26), a database search unit (DSU 28), one or more units of random access memory (RAM 30), and a unit of content addressable memory (CAM 32). The DMU 26 and DSU 28 are shown integrated here, but this is not a requirement. At least one unit of RAM 30 (or an equivalent) is needed, but the CAM 32 is optional, and only one unit will generally be used when it is present. Collectively, the RAM 30 and the CAM 32 provide storage for a "database" of the match addresses 20 (or, more typically, information from which the match addresses 20 are derivable). Factors influencing whether all of the database is stored in the RAM 30 or also partially in the CAM 32 include cost, speed, implementation complexity and, of course, the overall requirements for the search system 12 (i.e., the ultimate application).

When the CAM 32 is present, it associatively stores instances of the search information, address information, and prefix lengths. The search information here may be complete search keys 16, or just prefix portions of search keys 16. For instance, if the CAM 32 is used to store prefix length 2 in an 8-bit system, complete 8-bit search keys 16 could be used. This will, however, be inefficient in many embodiments and the same results could then be had by using only 2-bit search information. The address information here may be actual match addresses 20, or information from which they can be derived (e.g., a base for base plus offset addressing; a topic discussed further below). The prefix lengths are also stored in the CAM 32 so that they can be returned with the address information to the DSU 28 when a match occurs. The DSU 28 needs this to determine whether data from the RAM 30 or the CAM 32 is to be used for the match address 20. In the figures the CAM 32 is represented as two contiguous blocks, and the label "CAM" is used loosely to conotate the associative function being performed. Those skilled in the art will appreciate that the memory used for performing association (storing the search information) and that used for holding the associated data (the address information and prefix length) may be separated and that the latter may even be a different memory type (e.g., in RAM).

The DMU 26 accepts configuration commands and information from the user and executes maintenance operations on the database. For example, it stores information received in a proper location in the RAM 30 or CAM 32.

The DSU 28 accepts the search key 16 from the controller 14 and executes search operations on the database. It searches the RAM 30 and the CAM 32, and then uses the results of this to form the match address 20 used to index into the AC memory 22 and initiate retrieval there of the search result 24 (or, in some embodiments, to retrieve the search result 24 itself; see e.g., FIG. 9).

The search scheme 10 can apply to any type of longest prefix match application. For the following discussion, the example shown in FIG. 2, with an 8-bit search key, is used to illustrate this and other aspects of the invention.

As noted initially, in the RAM-stored data structure, or database, of the search scheme 10 a key goal may be that every possible prefix for every possible prefix length is represented. One way to implement this uses a single bit in RAM to represent the existence of a certain prefix with a certain length. The inventors presently term these bits "p-bits," making this approach a "p-bit format." For each prefix, the AC is stored as a word in the AC memory 22, another RAM, either on-chip or off-chip. The size of a word can be eight bits, 16 bits, or any size, depending on the end application requirements. In internetworking systems, for instance, this word can be used to encode the next hop for which a packet is destined.

Continuing with FIG. 7, it shows the configuration of the scheme. A p-bit with a value of "1" indicates that there is a prefix with that prefix length in the search table. Our example LPM search is with an 8-bit search key, so here prefixes with length eight require 256 p-bits for the 256 possible prefixes with that length (00000000, 00000001, . . . , 11111111). Prefixes with length seven require 128 p-bits for the 128 possible prefixes with that length, and so on, down to prefixes with prefix length one, which requires two p-bits. Each prefix length of prefixes must be represented in the data structure as p-bits, and can be stored in one or more units of the RAM 30, depending on many factors that will become apparent presently.

A choice may be made to offload some of the prefixes into the separate CAM 32. A typical decision-making process for this might be based on the data distribution of each possible prefix length in the search table. For example, prefix lengths with only a few prefixes could be stored in the CAM 32. As more and more prefix lengths are offloaded out of the data structure contained in the RAM 30, less hardware logic and a lower pin count are needed for the implementation. But this also requires more capacity in the CAM 32.

Figure 8:
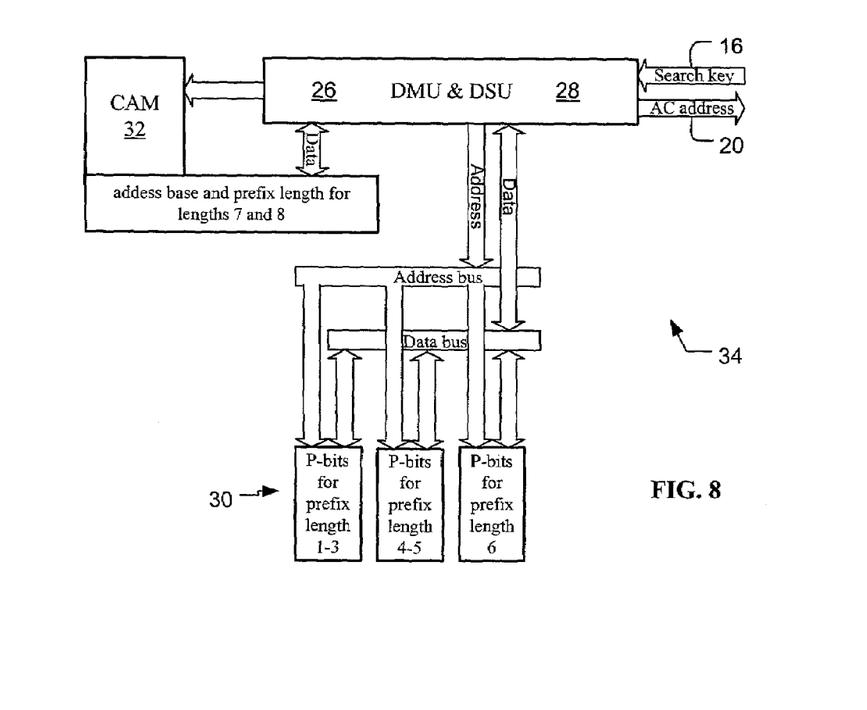
FIG. 8 is a block diagram showing an example architecture suitable for use in the search engine of FIG. 7.

FIG. 8 is a block diagram showing an example architecture 34 suitable for use in the search engine 18 of FIG. 7, one in which prefixes for the search key 16 with lengths from one to six are stored in three units of the RAM 30, and the prefixes with lengths seven and eight are stored in the unit of CAM 32. For example, in an internetworking switch/ router, when a route insertion or deletion is performed, the DMU 26 will know where to store or remove the prefix based on its length. If the prefix length is in CAM space, the DMU 26 will insert it into a free entry in the CAM 30, for insertions. Similarly, the DMU 26 will delete the entry from the CAM 32 for deletions. If the prefix length is in RAM space, e.g., when the prefix length is six, it sends the prefix as an address to the unit of RAM 30 that stores all prefixes with length six (64 bits, one bit for each possible 6-bit prefix). This will then identify the corresponding p-bit, which will then be enabled (1) for insertion or disabled (0) for deletion.

Now consider a search on this table-based scheme. When the 8-bit search key 16 comes in, the DSU 28 searches all of the data structure in the RAM 30, as well as in the CAM 32. This may also be done in parallel, if highest speed is desired. All eight bits are sent to the CAM 32, which will look for 7- and 8-bit prefix length matches. The six most significant bits (MSBs) will be sent to the part of the table (one of the units of RAM 30) containing all of the possible 6-bit prefixes, the five MSBs will be sent to the part of the table containing all possible 5-bit prefixes, and so on. Each of these parts of the table will identify whether a prefix of that length exists there, as indicated by the appropriate p-bit. The results coming back from all parts of the table (8-, 7-, 6-, . . . , 1-bit prefix lengths) will then pass through a priority encode function in the DSU 28, to select the longest prefix match from among all of the matching entries.

The resultant match address 20 sent to the AC memory 22 (FIG. 7) can be formed by a base-plus-offset system. Each of the prefix length tables can have its own pre-defined base address in the AC memory 22, where the AC for each p-bit resides in a different location. Now, in order to determine the match address 20 of the AC, we simply use the base address associated with the longest prefix match having priority, and add this base to the relative position of the p-bit as an offset. Once thus formed, the match address 20 is usable to read the AC memory 22 for the information which is then returned to the controller 14 as the search result 24 (FIG. 7).

Note that FIG. 8 also shows that multiple prefix tables can be combined into one physical unit of the RAM 30. Prefix length six is stored in the rightmost unit of the RAM 30, prefix lengths 4–5 are stored in the middle unit, and prefix lengths 1–3 are stored in the leftmost unit. Combining multiple prefixes into one unit of RAM 30 cuts down on the number of parallel searches needed, but it increases the amount of logic needed to extract out the proper p-bit (since now multiple p-bits may have to share RAM address lines). In fact, there are many different methods of implementing the prefix length tables into RAM, where each has tradeoffs of complexity, cost, speed, addressing scheme, etc.

Figure 9:
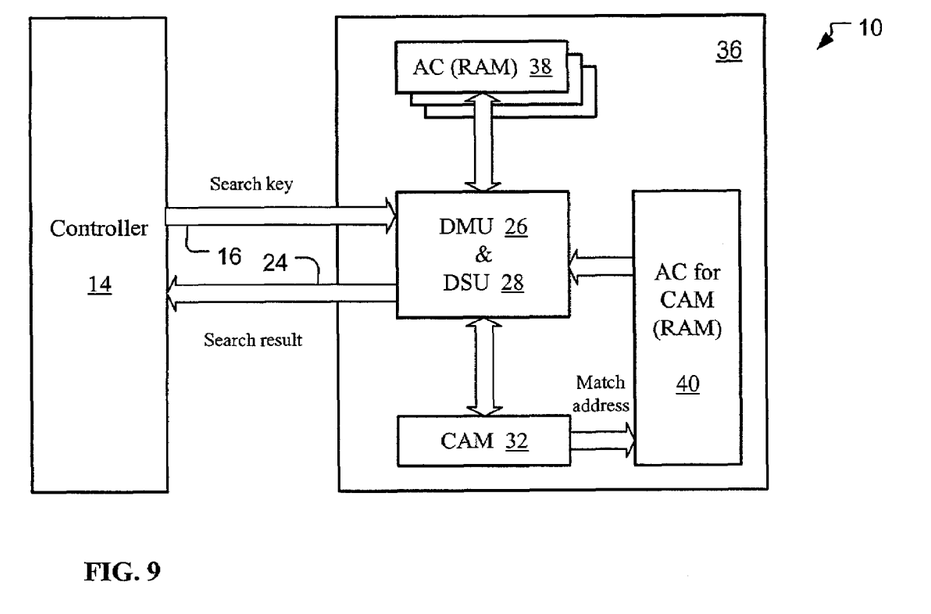
FIG. 9 is a block diagram showing an alternate configuration of a search engine according to the inventive search scheme.

FIG. 9 is a block diagram showing an alternate implementation for representing every possible prefix for every possible prefix length, in a search engine 36 according to the inventive search scheme 10. This approach can be termed "AC format." Here the AC memory 22 (FIG. 7) is dispensed with, the units of RAM 30 (FIGS. 7–8) are replaced with units of AC-RAM 38, and a CAM AC memory 40 is provided.

Instead of using a single p-bit in the RAM 30 to represent the existence of a certain prefix and length, this implementation of the data structure stores the prefix accessed AC itself in the AC-RAM 38. When no prefix exists in the word space, a pre-defined INVALID value is stored. Now, every possible prefix occupies an entry in the word space, and not just a single bit. For example, to store all of the prefixes with prefix length six requires 64 words. Like before, each length of prefixes can be stored in one or more units of the AC-RAM 38, depending on the desired tradeoffs, and infrequently used prefix lengths can be offloaded into the CAM 32, and the AC for those prefixes stored in the CAM AC memory 40.

Figure 10:
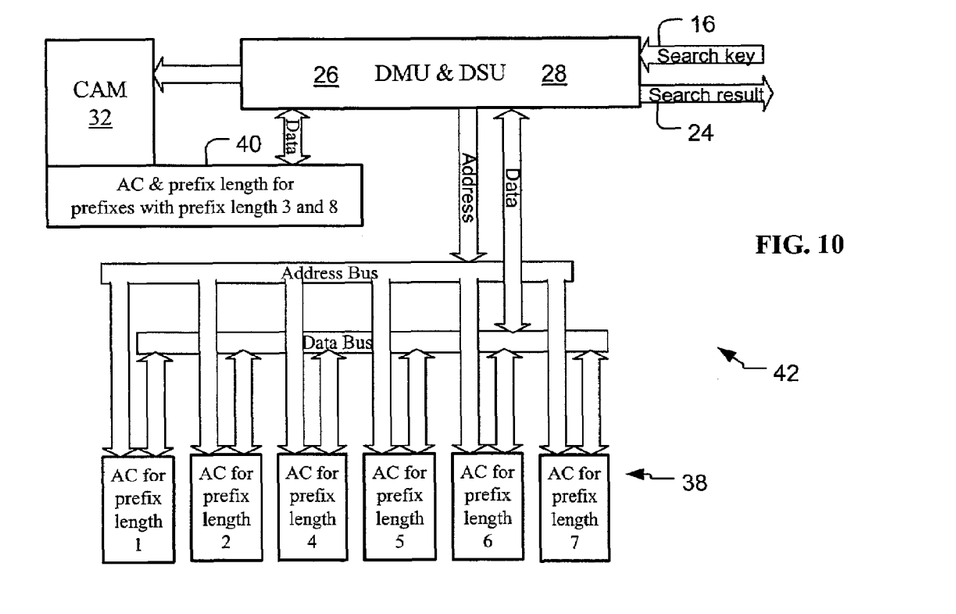
FIG. 10 is a block diagram showing an example architecture suitable for use in the search engine of FIG. 9.

FIG. 10 is a block diagram showing an example architecture 42 suitable for use in the search engine 36 of FIG. 9. Here the AC for prefixes with lengths 1, 2, 4, 5, 6, and 7 are stored in the units of AC-RAM 38, the prefixes with lengths three and eight are stored in the unit of CAM 32, and the AC for prefixes with those lengths are stored in the CAM AC memory 40.

For example, in internetworking a route insertion and deletion may proceed in a similar fashion to the first implementation (discussed above with respect to FIGS. 7–8), except that here the actual AC is placed into or removed from the data structure in the search engine 36. The results from the parallel searches can again be combined using a priority encode, but instead of computing a base-plus-offset address the AC can be immediately returned to the controller 14 as the search result 24.

Note that the approach illustrated in FIG. 10 does not limit how the AC data structure is stored in the AC-RAM 38. The concepts of FIGS. 7–8 can therefore still be applied. The p-bit and AC formats can even be mixed in one system. For example, prefixes with lengths of one to five may be stored in p-bit format in one unit of RAM, the AC for prefixes with length six may be stored by AC format in a unit of AC RAM, and the rest may be stored in a unit of CAM and a unit of CAM AC memory.

The invention also has a major advantage over prior searching solutions. From the above description, it is apparent that, for this scheme, the search and table update durations are deterministic for the worst case. Pipelined execution can also be easily applied to improve search speed. In view of the current and dropping cost of RAM the invention is very economical. For the prefix lengths that are stored in RAM, all of the possible prefixes with these lengths occupy a fixed space in the RAM. It is therefore trivial to find the one space associated with a given prefix of a given prefix length, and therefore, only one space needs to be updated when an insertion or removal of any prefix in the RAM is requested (i.e., the invention is also "maintenance deterministic"). Simple hardware circuitry can easily handle such maintenance operations.

In addition, since space is already reserved, the number of entries that this system can hold is deterministic ("capacity deterministic"). For example, consider IPv4 CIDR (Classless Inter-Domain Routing) where prefix lengths from one to 24 are stored in RAM. An implementation of the inventive search scheme 10 can support 32 million prefixes, since 32 million spaces ($2^{24}+2^{23}+2^{22}+ \ldots +2^{1}$) have already been set aside in the data structures. In contrast, existing solutions can, at most, support multiple hundreds of thousands of prefixes.

As noted above, the inventive search scheme 10 can be employed in any longest prefix match application. An example of this is now presented, applying the p-bit approach discussed above to tackle IPv4 CIDR routing.

Figure 11:
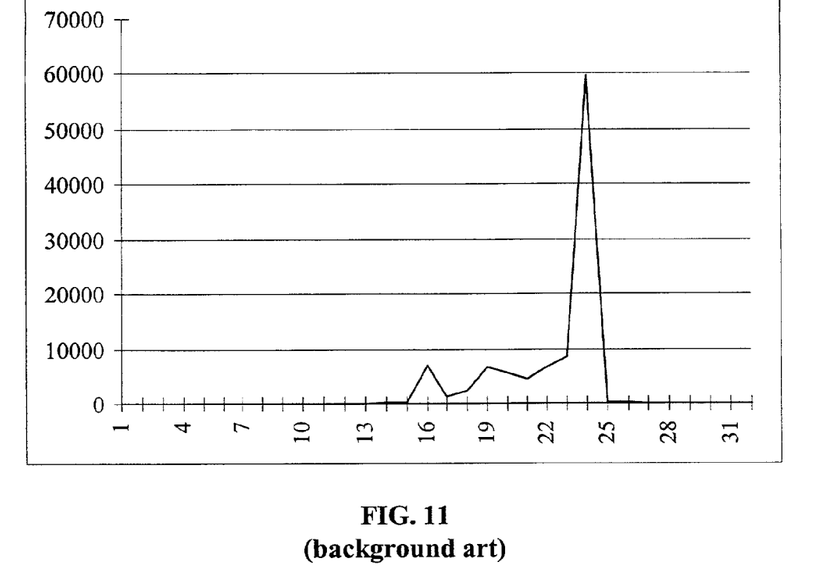
FIG. 11 (background art) is a graph showing the distribution of IPv4 prefix lengths for a typical Internet core router.

To begin, consider FIG. 11 (background art), a graph which shows the distribution of IPv4 prefix lengths for a typical Internet core router. Based on this, one can consider storing prefixes with lengths one to 15 and 25 to 32 in a CAM sub-system, and storing prefixes with lengths 16 to 24 in a RAM sub-system.

Figure 12:
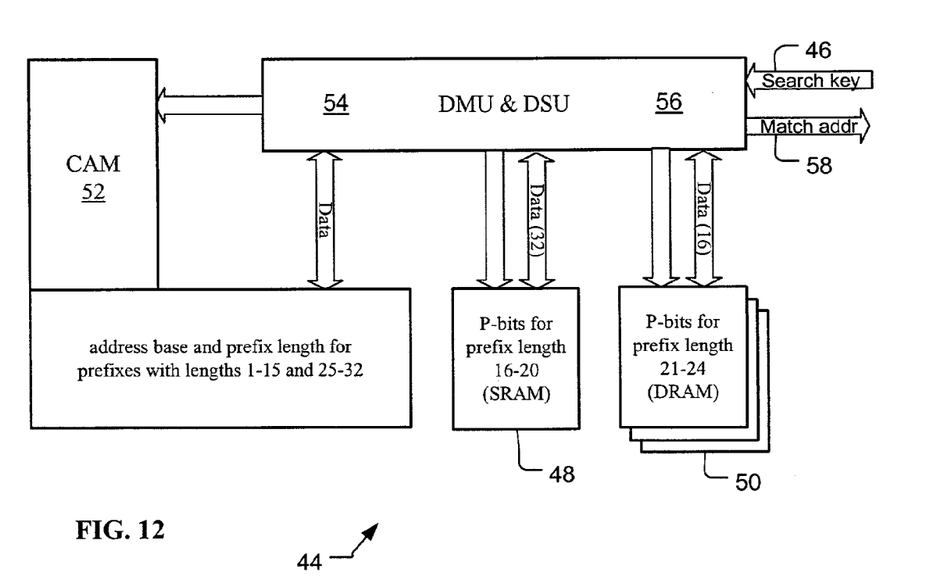
FIG. 12 is a block diagram showing an example architecture for use in the search engine of FIG. 11.

FIG. 12 is a block diagram showing an example architecture 44 suitable for this. The prefixes that are stored in RAM which may match a search key 46 here are be separated into two logical units (each of which may use one or more physical chips, modules, blocks, etc.). The prefix lengths 16 to 20 are represented in one logical unit of SRAM 48, the prefix lengths 21 to 24 are represented in one logical unit of DRAM 50, and the other prefixes (1–15 and 25–32) are represented in a CAM 52. A DMU 54 and a DSU 56 are present, and this architecture 44 similarly produces a match address 58.

Now, when the search key 46 comes in, three parallel accesses are performed, in order to lookup all of the 32 possible prefix lengths. The complete 32-bit search key 46 is sent to the CAM 52, the 21 MSBs of the search key 46 are sent to the 21–24 DRAM 50, and the 16 MSBs are sent to the 16–20 SRAM 48.

Figure 13A:
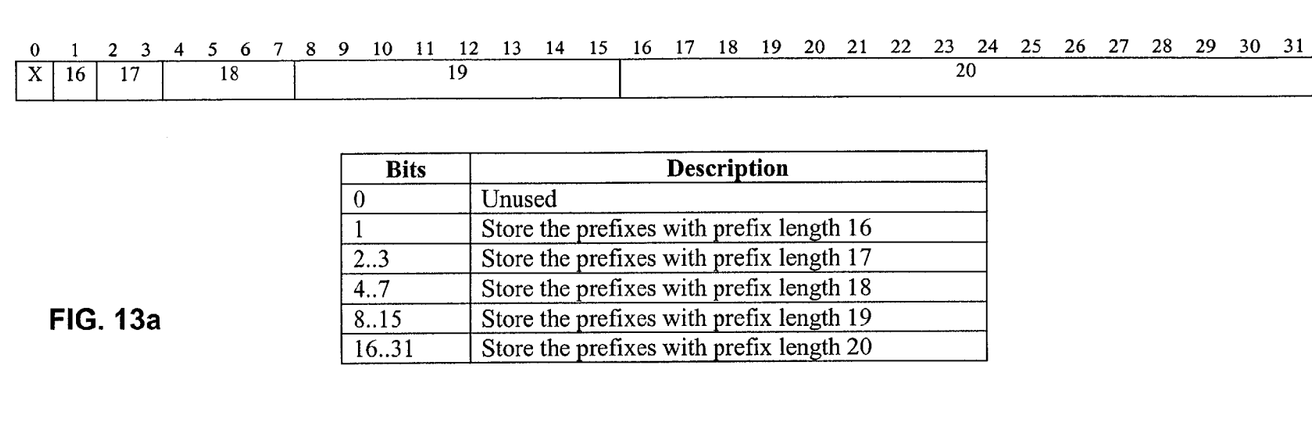
FIGS. 13a–b are tables showing a packing scheme which may be used to store the p-bits of multiple prefix lengths in the logical RAM in FIG. 12.
Figure 13B:
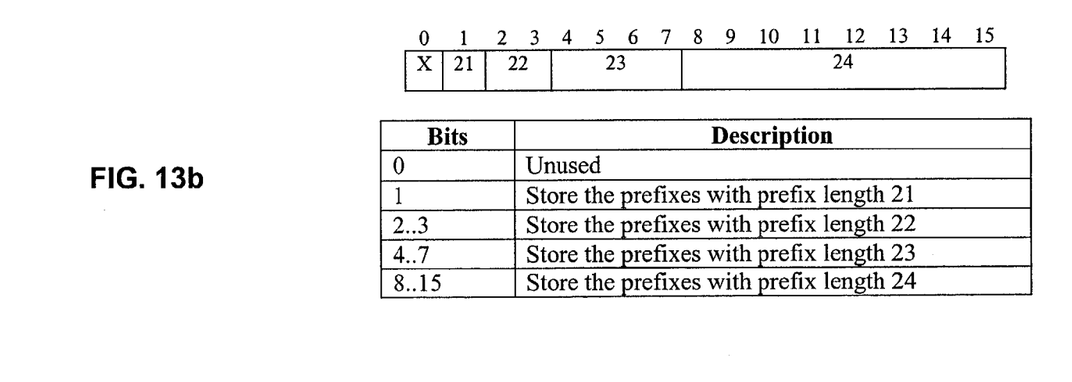

The packing scheme shown in FIGS. 13a–b may also be used to efficiently store the p-bits of multiple prefix lengths in each logical RAM. FIG. 13a depicts packing for the DRAM 50 and FIG. 13b depicts packing for the SRAM 48.

Proceeding now with FIG. 13a, in this example, when the DSU 56 sends the 16 MSBs of the search key 46 to the SRAM 48, a 32-bit vector will be returned. This 32 bit vector will contain all of the p-bits for all prefixes with lengths 16 to 20. Bits 16 to 31 of the vector will contain the 16 p-bits for prefix length 20, but this is efficiently accessed here using only 16 bits, instead of 20 bits for specific 16-bit MSBs. Bits eight to 15 will contain the eight p-bits for prefix length 19, when accessed using only 16 bits instead of 19. Bit one will contain the one p-bit for prefix length 16 (i.e., it is a match or it is not)), when accessed using the full 16 bits.

Upon return of this 32 bit vector to the DSU 56, the logic there extracts the correct p-bit for each of the prefix lengths. The use of this technique (placing multiple prefix length data structures into one logical RAM) trades off fewer logical memories for more internal p-bit extracting logic in the DSU 56.

In the example here, 64K×32 bits of memory are needed for the first logical memory (SRAM 48), and 2M×16 bits for the second logical memory (DRAM 50). Considering the cost and speed of current memory technology, SRAM may be used to implement the first logical RAM, and DRAM to implement the second. In order to get the DRAM performance to match that of the SRAM, duplicated DRAM may be used for pipeline type operation. The user of this architecture 44 should consider the tradeoffs associated with implementing each of these as combinations of external or internal SRAM or DRAM.

Thus, the above example clearly shows how the use of the inventive search scheme 10 can implement a deterministic capacity longest prefix match table (32 million prefixes). This table can be searched in a deterministic time, dictated by the slowest of the memory technologies used (e.g., DRAM, SRAM, or CAM), and this table can be updated with a deterministic single operation. All of this translates into a very cost effective solution, one that is easily implemented in hardware and which can easily scale as different longest prefix match requirements emerge.

Figure 14A:
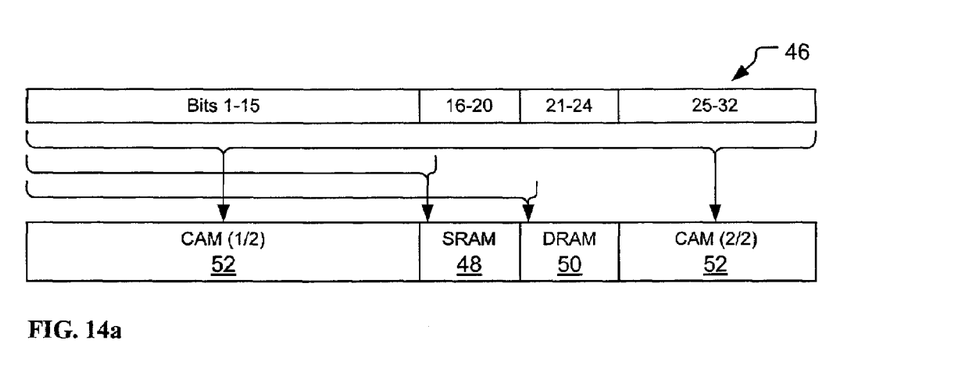
FIGS. 14a–c are block diagrams depicting mappings in capacity deterministic and two-stage non-capacity deterministic embodiments of the invention.
Figure 14B:
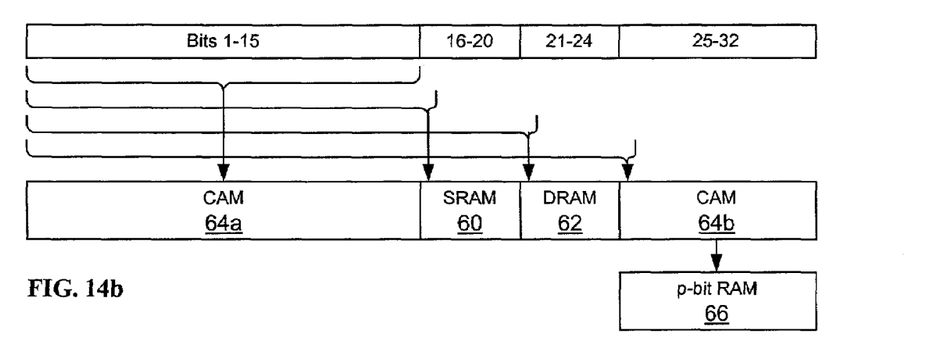
Figure 14C:
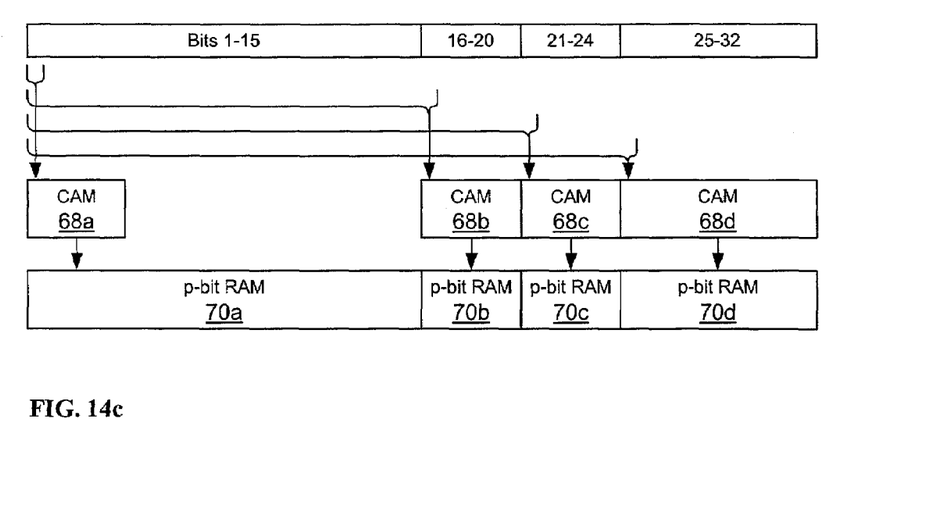

FIGS. 14a–c are block diagrams depicting mapping in a capacity deterministic embodiment of the inventive search scheme 10, such as that of FIG. 12, and mapping in embodiments where the p-bit format is employed in CAM sub-systems to trade deterministic capability for other benefits.

Starting with FIG. 14a, this illustrates the mapping used by the present architecture 44 in FIG. 12. [The CAM 52 need not be two discrete units, but using this depiction clarifies other points being made.] As can be seen, the CAM 52 must receive all 32 bits of the search key 46, because it has to handle prefixes including prefix length 32. As already discussed, above, the SRAM 48 receives only the first 16 bits of the search key 46, and the DRAM 50 receives only the first 21 bits of the search key 46.

FIG. 14b illustrates the mapping were a SRAM 60, DRAM 62, CAM 64a, CAM 64b, and a second stage RAM 66 are present. Conceptually, the SRAM 60, DRAM 62, and CAM 64a here are first stage units. As can now be seen, the CAM 64a receives only the first 15 bits of the search key 46, the SRAM 60 receives the first 16 bits, and the DRAM 62 receives 21 bits. However, the CAM 64b here only needs to receive the first 25 bits of the search key. In essentially the same manner as the packing described above, if a 25-bit instance of search information causes a match in the CAM 64b, the second stage RAM 66 is triggered and sends the DSU a stored address base and p-bit information. The DSU can then determine from this if the particular 25-bits of search information used were really for a 27-bit prefix match (because a p-bit representing a 27-bit match will be enabled). The DSU can then carry on with providing the most appropriate match address.

For example, the CAM 64b might be 1 K "deep," storing 1 K of 25-bit search information entries, and associated information. The second stage RAM 66 then needs to store 1 K of 255-bit p-bit entries. One bit in each entry represents whether that entry represents a 25-bit prefix match; two bits represent whether that entry represents either of the possible 26-bit prefix matches, four bits represent the possible 27-bit prefix matches; and so forth up to 128 bits in the entry representing all of the possible 32-bit prefix matches.

It should be noted that this scheme flexibly permits the concurrent use of multiple prefixes with the same first 25-bits. For instance, for a particular 25-bit search information value both a 26-bit and a 27-bit prefix match may be represented by enabled p-bits. The second stage RAM 66 can then send the DSU a stored address base, which is base of a location in memory were AC for all prefixes matches accessed by that particular 25-bit search information value are stored. The second stage RAM 66 also sends the DSU the p-bit information related to that particular value, i.e., here that a both particular 26-bit and 27-bit prefix matches are indicated. LPM or some other prioritizing criteria can be used by the DSU for a final selection, if desired. The DSU can then simply calculate an address offset to add to the address base and AC for either the 26-bit or 27-bit prefix match can now be retrieved.

Finally, FIG. 14c illustrates a mapping where this two stage approach is taken to its logical conclusion. The first stage memory here includes only CAMs 68a–d, for associatively accessing the second stage, and the second stage here includes only RAMs 70a–d for storing p-bits. Of course, using the CAM 68a for only the first bit of the search key would be absurd, and FIG. 14c is a conceptual depiction rather than one likely to be implemented. The size of the block for the CAM 68a stylistically emphasizes that the actual capacity of the CAMs 68a–d and RAMs 70a–d will be appropriate for the particular application. A salient point, however, is that in this manner the capabilities and constraints of respective memory types can be taken into account to produce efficient and economical embodiments of the inventive search scheme 10 for use in appropriate applications.

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

INDUSTRIAL APPLICABILITY

The present search scheme 10 is well suited for application in prefix match searching. The invention is fast, yet it also particularly supports the searching of large, even very large databases. The invention is also deterministic. Optionally, it may be capacity deterministic and be able to resolve to a search result even for a worst possible search case. Inherently the invention is time deterministic, that is, able to resolve to a search result or to perform maintenance operations in a consistent, short periods of time.

The search scheme 10 can be used to perform longest prefix match (LPM) searching, although alternate prefix prioritizing can also be used. This particularly addresses present needs in industries like internetworking, and FIGS. 11–14 and the discussion there of have been used above to illustrate this.

Once the teachings herein are grasped, the search scheme 10 can easily be implemented in hardware circuits by those skilled in the relevant arts. Such hardware implementations can further include both the invention's operational and database maintenance needs. The invention may employ conventional memory types, like DRAM, SRAM, and CAM. Yet it can do so in a very flexible manner. For instance, as CAM is widely appreciated to be expensive and sometimes problematical in other regards, its use in the invention is optional, and then may be limited to where it will be cost effective and efficient.

Furthermore, even with all of the above benefits, and others, which the inventive search scheme 10 can provide, it is economical. In construction and operation its economy rivals or exceeds that of prior art search schemes. In many applications the invention simply excels, including needful prefix search applications that have heretofore not been possible due to the economic impracticalities of the prior art.

For the above, and other, reasons, it is expected that the search scheme 10 of the present invention will have widespread industrial applicability, and that the commercial utility of the present invention will be extensive and long lasting.

What is claimed is:

1. A method of performing searching based on prefix matching, the method comprising the steps of:
   (a) receiving a search key;
   (b) addressably accessing one or more bit tables based on said search key, wherein said bit tables each include p-bits representing all possible prefixes, of one prefix length, which may match said search key and each said p-bit is either an enabled p-bit indicating that its said prefix does match said search key or said p-bit is a disabled p-bit indicating otherwise;
   (c) determining up to one said enabled p-bit from each said bit table to be a match p-bit;
   (d) selecting up to one said match p-bit to be a priority p-bit; and
   (e) deriving a match address based on consideration of said priority p-bit, wherein said match address is where a search result is stored.

2. The method of claim 1, further comprising:
   (f) addressably accessing a primary result table based on said match address, wherein said primary result table includes said search results for said prefixes represented in said bit tables;
   (g) determining up to one said search result from said primary result table to be a match result;
   (h) addressably accessing one or more secondary result tables based on said search key, wherein said secondary result tables each include said search results for additional said prefixes, of one said prefix length, which may match said search key;
   (i) determining up to one said search result from each said secondary result table to also be a said match result; and
   (j) selecting one said search result from among said match results.

3. The method of claim 1, wherein said bit tables represent all represented prefixes for said search keys.

4. The method of claim 1, wherein said bit tables are each stored in separate memory units.

5. The method of claim 1, wherein multiple said bit tables are stored in a single memory unit and are for instances of said prefix lengths which are not sequential.

6. The method of claim 1, wherein said step (d) includes selecting said priority p-bit based on a longest said prefix length.

7. The method of claim 1, wherein said step (e) includes calculating said match address based on said priority p-bit.

8. The method of claim 7, wherein said calculating said match address includes basing from which said bit table said priority p-bit is in and offsetting from where said priority p-bit is in its respective said bit table.

9. The method of claim 1, further comprising:
   (f) maintaining said bit tables by selectively setting said p-bits to be said enabled p-bits or by selectively setting said p-bits to be said disabled p-bits, thereby permitting searching with new said search keys to obtain new said search results and not obtaining any said search results when searching with obsolete said search keys.

10. The method of claim 1, further comprising:
    (f) storing a plurality of potential said search results; and
    (g) providing one said search result based on said match address.

11. A method of performing searching based on prefix matching, the method comprising the steps of:
    (a) receiving a search key;
    (b) addressably accessing one or more result tables based on said search key, wherein said result tables each include search results for all possible prefixes, of one prefix length, which may match said search key;
    (c) determining up to one said search result from each said result table to be a match result; and
    (d) selecting one said search result from among said match results.

12. The method of claim 11, wherein said result table is a primary result table, and further comprising:
    (e) associatively accessing one or more vector address tables based on said search key, wherein said vector address tables include addresses in a respective vector table;
    (f) determining up to one said address in each said vector address table to be a vector address;
    (g) addressably accessing said vector tables based on said vector addresses, wherein said vector tables each include bit vectors of p-bits representing additional said prefixes, of a plurality of sequential said prefix lengths, which may match said search key and each said p-bit is either an enabled p-bit indicating that its said prefix does match said search key or said p-bit is a disabled p-bit indicating otherwise;

(h) retrieving one said bit vector from each said vector table accessed;

(i) selecting up to one said bit vector to be a priority vector;

(j) deriving a match address based on said priority vector;

(k) addressably accessing a secondary result table based on said match address, wherein said secondary result table includes said search results for said prefixes represented in said vector tables; and (l) determining up to one said search result from said secondary result table to also be a match result.

13. The method of claim 11, wherein said result tables represent all represented prefixes for said search keys.

14. The method of claim 11, wherein said result tables are each stored in separate memory units.

15. The method of claim 11, wherein multiple said result tables are stored in a single memory unit and are for instances of said prefix lengths which are not sequential.

16. The method of claim 11, wherein said step (d) includes selecting said one said search result based on a longest said prefix length.

17. A method of performing searching based on prefix matching, the method comprising the steps of:

(a) receiving a search key;

(b) associatively accessing one or more vector address tables based on said search key, wherein said vector address tables include addresses in a respective vector table;

(c) determining up to one said address in each said vector address table to be a vector address;

(d) addressably accessing said vector tables based on said vector addresses, wherein said vector tables each include bit vectors of p-bits representing all possible prefixes, of a plurality of sequential prefix lengths, which may match said search key and each said p-bit is either an enabled p-bit indicating that its said prefix does match said search key or said p-bit is a disabled p-bit indicating otherwise;

(e) retrieving one said bit vector from each said vector table accessed;

(f) selecting up to one said bit vector to be a priority vector; and (g) deriving a match address based on consideration of said priority vector, wherein said match address is where a search result is stored.

18. The method of claim 17, further comprising:

(h) addressably accessing one or more bit tables based on said search key, wherein said bit tables each include said p-bits representing other said prefixes, of one prefix length, which may match said search key;

(i) determining up to one said enabled p-bit from each said bit table to be a match p-bit; and (j) selecting up to one said match p-bit to be a priority p-bit;

and wherein:

said step (g) includes deriving said match address based on consideration of said priority vector and said priority p-bit.

19. The method of claim 17, wherein said vector tables represent all represented prefixes for said search keys.

20. The method of claim 17, wherein said step (f) includes selecting said priority based on a longest said prefix length.

21. The method of claim 17, further comprising:

(h) storing a plurality of potential said search results; and (i) providing one said search result based on said match address.

22. A search engine for performing prefix match searching, comprising:

a bit memory suitable for addressably storing one or more bit tables of p-bits each representing all possible prefixes, of one prefix length, which may match a search key, wherein each said p-bit is either an enabled p-bit, indicating that its said prefix matches a search key, or said p-bit is a disabled p-bit indicating otherwise; and a database search unit (DSU) suitable for receiving a said search key via an input bus, accessing said bit memory based on addressing derived from said search key, determining up to one said enabled p-bit from each said bit table to be a match p-bit, selecting up to one said match p-bit to be a priority p-bit, and deriving a match address based on consideration of said priority p-bit, wherein said match address is where a search result is stored.

23. The search engine of claim 22, further comprising:

a primary result memory suitable for addressably storing a primary result table of said search results, wherein said primary result table includes said search results for said prefixes represented in said bit tables;

a secondary result memory suitable for addressably storing one or more secondary result tables of said search results, wherein said secondary result tables each include search results for all possible prefixes, of one prefix length, which may match said search key; and said database search unit (DSU) further suitable for determining up to one said search result from said primary result table to be a match result, accessing said secondary result memory based on addressing derived from said search key, determining up to one said search result from said secondary result table to also be a said match result, and selecting one said search result from among any said match results.

24. The search engine of claim 22, wherein said bit memory comprises a plurality of memory units and said DSU is further suitable for accessing at least one said bit table stored in each said memory unit.

25. The search engine of claim 22, wherein said bit memory comprises at least one memory unit and said DSU is further suitable for accessing multiple said bit tables stored in one said memory unit which are respectively for instances of said prefix lengths which are not sequential.

26. The search engine of claim 22, wherein said DSU is further suitable for selecting said priority p-bit based on a longest said prefix length.

27. The search engine of claim 22, wherein said DSU is further suitable for calculating said match address based on said priority p-bit.

28. The search engine of claim 27, wherein said DSU is further suitable for calculating said match address by basing from which said bit table said priority p-bit is in and by offsetting from where said priority p-bit is in its respective said bit table.

29. The search engine of claim 22, further comprising a database maintenance unit (DMU) suitable for maintaining said bit tables by selectively setting said p-bits to be said enabled p-bits or by selectively setting said p-bits to be said disabled p-bits, thereby permitting searching with new said search keys to obtain new said search results and not obtaining any said search results when searching with obsolete said search keys.

30. The search engine of claim 22, further comprising a result memory suitable for storing a plurality of potential said search results and providing one said search result based on said match address.

31. A search engine for performing searching based on prefix matching, comprising:
- a primary result memory suitable for addressably storing one or more primary result tables of search results, wherein said primary result tables each include search results for all possible prefixes, of one prefix length, which may match said a search key;
- a vector address memory suitable for associatively storing vector addresses;
- a vector memory suitable for addressably storing bit vectors including p-bits representing all possible prefixes of a plurality of sequential prefix lengths and each said p-bit is either an enabled p-bit indicating that its said prefix does match said search key or said p-bit is a disabled p-bit indicating otherwise;
- a secondary result memory suitable for addressably storing a secondary result table of additional said search results for said prefixes represented in said vector tables; and
- a database search unit (DSU) suitable for receiving said search key via an input bus, accessing said result memory based on addressing derived from said search key, determining up to one said search result from said result memory to be a match result, accessing said vector address memory based on said search key, retrieving one or more said vector addresses, accessing said vector memory based on said vector addresses, retrieving one said bit vector for each said vector address, selecting one said bit vector to be a priority vector, deriving a match address based on consideration of said priority vector, determining up to one said search result from said secondary result table to also be a said match result, and selecting one said search result from among any said match results.

32. The search engine of claim 31, wherein said result memory comprises a plurality of memory units and said DSU is further suitable for accessing at least one said bit table stored in each said memory unit.

33. The search engine of claim 31, wherein said result memory comprises at least one memory unit and said DSU is further suitable for accessing multiple said result tables stored in one said memory unit which are respectively for instances of said prefix lengths which are not sequential.

34. The search engine of claim 31, wherein said DSU is further suitable for selecting said one said search result based on a longest said prefix length.

35. A search engine for performing searching based on prefix matching, comprising:
- a vector address memory suitable for associatively storing vector addresses;
- a vector memory suitable for addressably storing bit vectors including p-bits representing all possible prefixes of a plurality of sequential prefix lengths and each said p-bit is either an enabled p-bit indicating that its said prefix does match said a search key or said p-bit is a disabled p-bit indicating otherwise; and
- a database search unit (DSU) suitable for receiving a said search key via an input bus, accessing said vector address memory based on said search key, retrieving one or more said vector addresses, accessing said vector memory based on said vector addresses, retrieving one said bit vector for each said vector address, selecting one said bit vector to be a priority vector, and deriving a match address based on consideration of said priority vector, wherein said match address is where a search result is stored.

36. The search engine of claim 35, further comprising:
- a bit memory suitable for addressably storing one or more bit tables of said p-bits each representing other said prefixes representing all possible prefixes, of one prefix length, which may match said search key; and
- said database search unit (DSU) further suitable for accessing said bit memory based on addressing derived from said search key, determining up to one said enabled p-bit from each said bit table to be a match p-bit, selecting up to one said match p-bit to be a priority p-bit, and deriving a match address based on consideration of said priority vector and said priority p-bit.

37. The search engine of claim 35, wherein said DSU is further suitable for selecting said priority vector based on a longest said prefix length.

38. The search engine of claim 35, further comprising a result memory suitable for storing a plurality of potential said search results and providing one said search result based on said match address.

* * * * *